United States Patent
De La Salle et al.

(10) Patent No.: US 6,687,582 B1
(45) Date of Patent: Feb. 3, 2004

(54) CONTROL OF IDLE SPEED IN A HYBRID POWERTRAIN CONFIGURATION

(75) Inventors: Stephen De La Salle, Danbury (GB); Michael Larsen, Livonia, MI (US); Rongjun Zhang, Santa Rosa, CA (US); Mathew Breton, Westland, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/214,649

(22) Filed: Aug. 8, 2002

(51) Int. Cl.$^7$ ................................................ G06F 7/00
(52) U.S. Cl. .................. 701/22; 701/84; 180/65.3; 290/40 C; 477/129
(58) Field of Search .......................... 701/22, 51, 53, 701/84, 90, 54; 180/65.3, 65.2; 477/7, 129, 2; 318/139; 290/40 C

(56) References Cited

U.S. PATENT DOCUMENTS

| | | |
|---|---|---|
| 4,556,943 A | 12/1985 | Pauwels et al. |
| 5,199,326 A | 4/1993 | Iwatsuki et al. |
| 5,280,223 A | 1/1994 | Grabowski et al. |
| 6,048,288 A | 4/2000 | Tsujii et al. |
| 6,176,807 B1 | 1/2001 | Oba et al. |
| 6,267,706 B1 | 7/2001 | Kuroda et al. |
| 6,276,131 B1 | 8/2001 | Ueno et al. |
| 6,301,529 B1 | 10/2001 | Itoyama et al. |
| 6,348,771 B1 * | 2/2002 | Morimoto et al. .......... 318/139 |
| 6,373,206 B1 * | 4/2002 | Morimoto et al. .......... 318/139 |

* cited by examiner

Primary Examiner—Gertrude Arthur
(74) Attorney, Agent, or Firm—Brinks Hofer Gilson & Lione

(57) ABSTRACT

The present invention includes an apparatus and a method for controlling the idle speed of a powertrain. The possible idle speed control operating modes detailed are (1) engine-torque-control/motor-speed-control, (2) engine-off/motor-speed-control, and (3) engine-speed-control/motor-torque-control. The engine-off/motor-speed-control mode is used when all conditions to turn the engine off are met. The motor is run at a speed that is determined by the ancillary demands—subject to motor or engine constraints. The engine-torque-control/motor-speed-control operating mode is used when the engine is required to be on to provide torque to various mechanically driven ancillary loads, or to charge the batteries. The engine-speed-control/motor-torque-control operating mode is used when the engine is required to be on because of conditions not related to providing torque to other components.

13 Claims, 4 Drawing Sheets

CONTROL OF IDLE SPEED IN A HYBRID POWERTRAIN CONFIGURATION

BACKGROUND OF THE INVENTION

1. Field of the Invention

The present invention relates to the field of powertrain control systems for hybrid powertrain configurations. In particular, the present invention includes a system and method for controlling the idle speed of a hybrid powertrain utilizing the torque from one or both of an internal combustion engine and an electric motor-generator.

2. Description of the Related Art

Hybrid vehicles generally consist of series hybrid vehicles, powersplit hybrid vehicles, and parallel hybrid vehicles. Parallel hybrid vehicles usually include at least a internal combustion engine and a motor-generator disposed along a vehicle powertrain such that the torques produced by each drive means are effectively summed together to drive ,the vehicle. A typical hybrid vehicle is usually driven directly by the mechanical output of the internal combustion engine. However, when the vehicle must be accelerated or decelerated at a rate that cannot be accomplished by the internal combustion engine alone or if the drive efficiency of the engine would be degraded if only the internal combustion engine were used, the motor-generator, which is mechanically connected to the powertrain, operates as an electric motor (during acceleration) or as an electric generator (during deceleration) to compensate for the limitations or inefficiencies of the internal combustion engine.

In a hybrid vehicle the motor-generator can provide rapid acceleration or deceleration. Fluctuation in the internal combustion engine's speed can be suppressed, and thus the hybrid vehicle provides the advantages of reduced fuel consumption and reduced emissions. Since the consumption of the internal combustion engine can be regulated as desired, the hybrid vehicle can be low-noise, low-emission and low-fuel consumption vehicle. For example, the hybrid vehicle can be driven by only the motor-generator even if the internal combustion engine is stopped, since both the internal combustion engine and the motor-generator are selectively mechanically connected to the driving wheels. The motor can also quickly start and stop the internal combustion engine, further increasing fuel economy.

A problem that arises in a typical hybrid vehicle occurs when the vehicle is in an idle state, i.e. the torque provided by the respective powertrain components is not being transferred to the drive wheels. Nevertheless, any hybrid powertrain must operate in a neutral, speed control mode for various purposes including powering accessories, recharging batteries, or warming up the internal combustion engine and exhaust aftertreatment system, or meeting other requirements. A specific control system for controlling the idle speed of a hybrid powertrain is therefore desirable.

Generic drive control systems exist for hybrid vehicles. For example, one drive control system discloses an apparatus and method for limiting the usage of the internal combustion engine such that the necessary torque is generated, the fuel consumption of the vehicle is maximized, and the undesirable emissions from the vehicle are minimized. The aforementioned system, however, does not disclose a control system for specifically controlling the performance of the hybrid powertrain when the powertrain is in an idle model

BRIEF SUMMARY OF THE INVENTION

Accordingly, the present invention provides an apparatus and a method for controlling the idle speed .of a powertrain. The present invention receives information about the state of the Starting/Lighting/ignition (SLI) 12 V battery and the High Voltage (HV) battery, and demands from accessories like air conditioning to determine which of several idle speed control modes the powertrain should operate within, and then executes that control strategy.

The possible idle speed control operating modes detailed are (1) engine-torque-control/motor-speed-control, (2) engine-off/motor-speed-control, and (3) engine-speed-control/motor-torque-control. Note that the mode engine-speed-control/motor-off is assumed to be a special case of (3) above wherein the desired motor torque is zero, meaning that the motor is switched off.

The engine-off/motor-speed-control mode is used when all conditions to turn the engine off (such as catalytic converter temperature, engine temperature, battery state of charge, etc) are met. The motor is run at a speed that is determined by the ancillary demands—subject to motor or engine constraints.

The engine-torque-control/motor-speed-control operating mode is used when the engine is required to be on to provide torque to various mechanically driven ancillary loads, or to charge the batteries. The engine torque is set to meet the requirements and demands, and the fast response of the motor in speed-control mode is used to keep the engine at idle speed. Note that if the engine runs smoother under heavy load, then the engine idle speed may be lowered. This instance may occur, for example, if the motor is generating power into the battery.

The engine-speed-control/motor-torque-control operating mode is used when the engine is required to be on because of conditions not related to providing torque to other components. Using this scheme, the engine is set into idle-speed control mode, and the motor is used to provide fast transient responses to keep the idle speed smooth, and to keep the engine slightly under load for "opportunistic" charging and to allow the engine to operate at a lower idle speed and more smoothly.

DETAILED DESCRIPTION OF THE INVENTION

Figure 1:
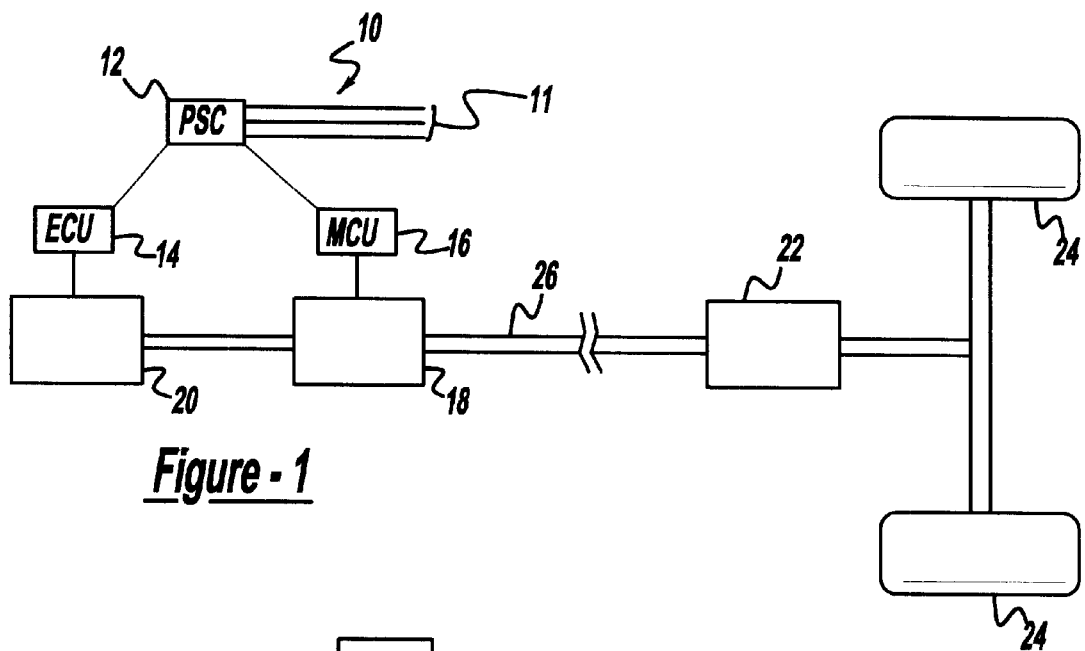
FIG. 1 is a schematic block diagram of a typical hybrid vehicle powertrain showing the control system of the present invention.

In accordance with the present invention, FIG. 1 is a schematic block diagram of a hybrid vehicle powertrain incorporating an idle speed control system 10 further described herein. The idle speed control system 10 includes a Powertrain System Controller (PSC) 12 receiving a plurality of vehicle state inputs 11. The PSC 12 is coupled to an Engine Control Unit (ECU) 14 and a Motor Control Unit (MCU) 16. As shown, the PSC 12, ECU 14, and MCU 16 are distinct control systems. However, in a preferred embodiment, the PSC 12, ECU 14, and MCU 16 are integrated into a single control system (not shown) for controlling the idle speed of a hybrid vehicle powertrain.

In a preferred embodiment, the PSC 12 controls both the ECU 14 and MCU 16, which are operatively coupled to an internal combustion engine 20 and an electric motor 18, respectively. The internal combustion engine 20 and the electric motor 18 are coupled to the vehicle driveline 26, which transmits the collective torque output of the internal combustion engine 20 and electric motor 18 to a transmission assembly 22. The transmission assembly 22 transmits the drive torque to a pair of drive wheels 24 for driving the hybrid vehicle. In the configuration shown, the electric motor 18 is disposed between the internal combustion engine 20 and the transmission assembly 22, a so-called in-line configuration. Alternatively, the powertrain may be constructed in a "belt-driven" configuration in which the internal combustion engine 20 is disposed between the electric motor 18 and the transmission assembly 22.

The PSC 12 is adapted to receive drive state inputs 11 and control the ECU 14 and the MCU 16 in response thereto. Representative drive state inputs 11 include driver intent (i.e. torque demand from driver), vehicle state (transmission gearing, engine temperature, auxiliary loads), and battery health (state of charge of the battery). Given the respective drive state inputs 11, the PSC 12 schedules idle speed control through powers, torques, and speeds from the internal combustion engine 20 and the electric motor 18. The local control units, i.e. the ECU 14 and the MCU 16, execute the delivery of the commands. The PSC 12 administers the idle speed control in accordance with the following control scheme.

Figure 2:
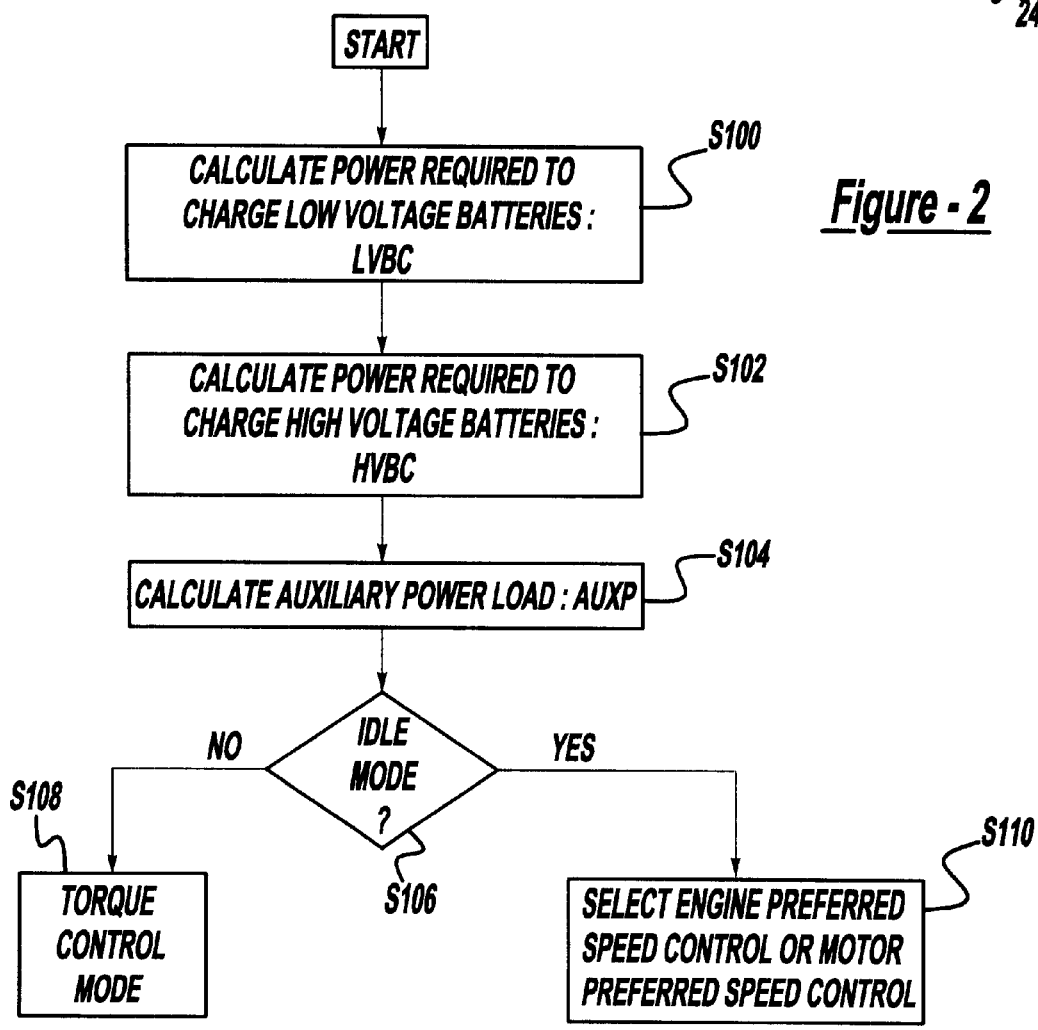
FIG. 2 is a flow chart depicting the operation of the Powertrain System Controller of the present invention.

FIG. 2 shows a flowchart corresponding to an initial control scheme implemented by the PSC 12. In step S100, the PSC 12 calculates the power necessary to charge the low voltage batteries, LVBP. In step S102, the PSC calculates the power necessary to charge the high voltage batteries, HVBP. In step S104, the PSC 12 calculates the power necessary to drive an auxiliary power load, AUXP, such as an air conditioning system (not shown). In step S106, the PSC 12 inquires as to whether the hybrid powertrain is in an idle mode. This determination is made based upon the drive state inputs 11 received continuously by the PSC 12.

If the powertrain is not in an idle mode, then the PSC 12 enters a torque control mode corresponding to step S108. The details of the torque control mode are discussed further herein. If the powertrain is in an idle mode, then the PSC 12 selects one of the ECU 14 or the MCU 16 to perform engine-preferred speed control or motor-preferred speed control, respectively, in accordance with step S110.

Figure 3:
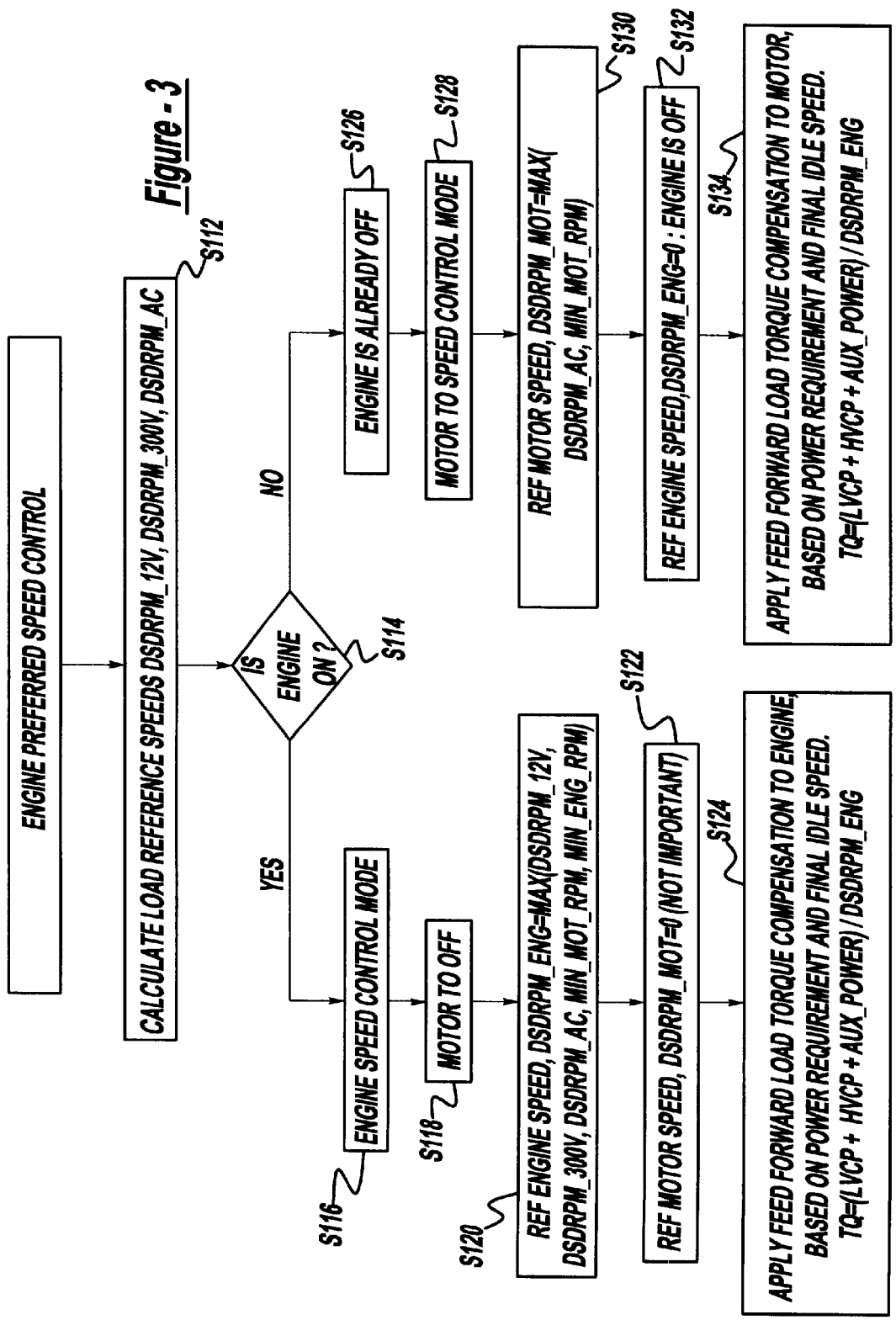
FIG. 3 is a flow chart, depicting the operation of the Engine Control Unit of the present invention.

The engine-preferred speed control scheme is detailed in FIG. 3. Upon selecting the ECU 14 to execute the control scheme, the PSC 12 delegates the task of engine speed control to the ECU 14 such that the speed of the internal combustion engine 20 is controlled locally to the reference speed determined by the PSC.

In step S112, the PSC 12 calculates reference speeds for the respective loads on the powertrain: a high-voltage battery, a low-voltage battery, and an auxiliary load, for example an air-conditioning system. The required revolutions per minute (RPM) of the loads are denoted DSDRPM_12 V, DSDRPM_300 V, and DSDRPM_AC respectively. After calculating the reference speeds, the PSC 12 progresses to step S114.

In step S114, the PSC 12 inquires as to whether the internal combustion engine 20 is operating. If the internal combustion engine 20 is operational, then the PSC 12 progresses from step S114 to step S116 in which the engine speed control mode is initialized. In step S118, the PSC 12 terminates the operation of the electric motor 18, such that the reference speed for the electric motor 18, DSDRPM_MOT, is set to zero.

In step S120, the PSC 12 sets the reference speed of the ECU 12, DSDRPM_ENG, to a value. This value is based of the load requirements, DSDRPM_12 V, DSDRPM_300 V, and DSDRPM_AC, as well as the minimum allowable engine speed, MIN_ENG_RPM. The internal combustion engine 20 is thereby directed to operate at a rotational speed as determined by the PSC 12. In step S122, the PSC 12 sets the motor reference speed to zero.

Returning to step S114, if the internal combustion engine 20 is not operating, as indicated in step S126, then the PSC 12 sets MCU 16 to speed control mode as shown in step S128. If the internal combustion engine 20 is not operating, then the reference engine speed, DSDPRPM_ENG, is set to zero.

Accordingly, in step S130, the PSC 12 determines a reference speed for the MCU 16. The reference speed, DSDRMP_MOT, is calculated based upon the maximum of the load requirements, DSDRPM_12 V, DSDRPM_300 V, including and DSDRPM_AC, as well as the minimum allowable motor speed, MIN_MOT_RPM. The MCU 16 is thereby directed to control the motor at the required rotational speed. .

Figure 4:
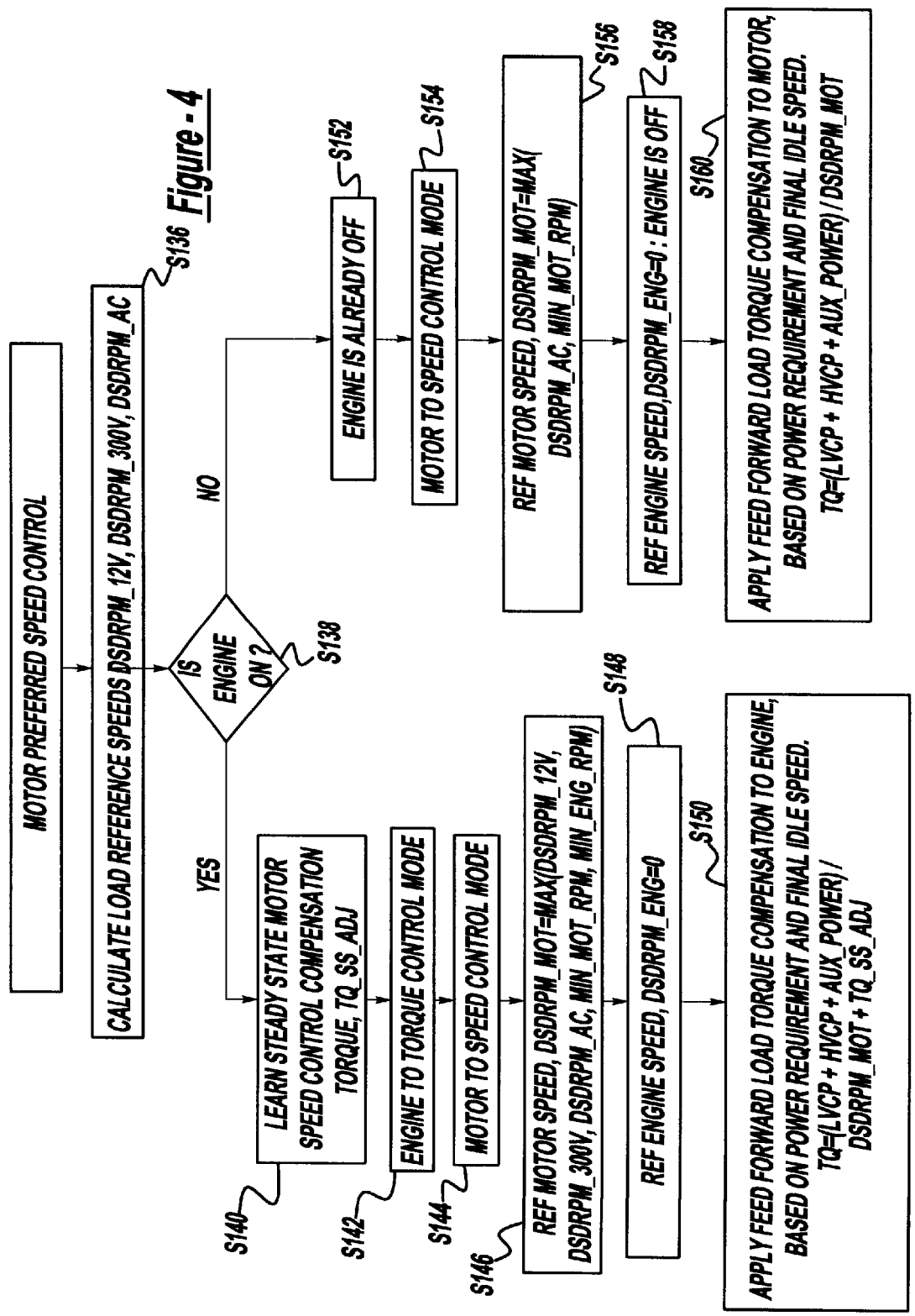
FIG. 4 is a flow chart depicting the operation of the Motor Control Unit of the present invention.

FIG. 4 is a block diagram showing the control scheme for the motor-preferred speed control of the idle speed of the hybrid powertrain. Upon selecting the PSC 12 to execute the control scheme, the PSC 12 delegates the task of motor speed control to the MCU 16 such, that the speed of the electric motor 18 is controlled locally.

In step S136, the PSC 12 calculates reference speeds for the respective loads on the powertrain: a high-voltage battery, a low-voltage battery, and an auxiliary load, for example an air-conditioning system. The required revolutions per minute (RPM) of the loads are denoted DSDRPM_12 V, DSDRPM_300 V, and DSDRPM_AC respectively. After calculating the reference speeds, the PSC 12 progresses to step S138.

In step S138, the PSC 12 determines whether the internal combustion engine 20 is operating. If the internal combustion engine 20 is operational, then it progresses from step S138 to step S140 in which the PSC 12 learns the steady state motor speed control compensation torque, TQ_SS_ADJ. The adaptive torque adjustment term, TQ_ADJ_SS, is calculated. This represents the steady state torque offset required to drive the motor to a particular steady state operating point. For example, if the motor is operating at a steady state torque operating point of 10 Nm (Newton-meters) and the required operating point is 10 Nm, then TQ_SS_ADJ will take the value of 10 Nm. This will drive the motor to operate around 10Nm as the engine is providing the required torque offset. The motor may be required to operate at a non-zero mean operating point, for example, based on motor efficiency considerations. The PSC 12 continually calculates the adaptive torque adjustment term and commands the ECU 14 to operate the engine at the required torque. In step S142 the PSC 12 sets the ECU 14 to torque control mode. In step S144 sets the MCU 16 to speed control mode.

In step S146, the PSC 12 sets the reference speed of the MCU 16, DSDRPM_MOT, to a value. The value of DSDRMP_MOT is calculated based upon the maximum of the load requirements, DSDRPM_12 V, DSDRPM_300 V, and including DSDRPM_AC, as well as the minimum allowable motor speed, MIN_MOT_RPM. The ECU 14 is accordingly directed to control the engine at a rotational speed of zero as determined by the PSC 12 in step S148.

In step S150, the PSC 12 commands to the ECU the feedforward torque request based on the power requirements of the various powertrain loads, the required idle speed and the torque adjustment factor, TQ_SS_ADJ.

Returning to step S138, if the internal combustion engine 20 is not operating, as indicated in step S152, then the PSC 12 sets the ECU 12 speed control mode as shown in step S154. If the internal combustion engine 20 is not operating, then the reference engine speed, DSDRPM_ENG, is set to zero.

Figure 5:
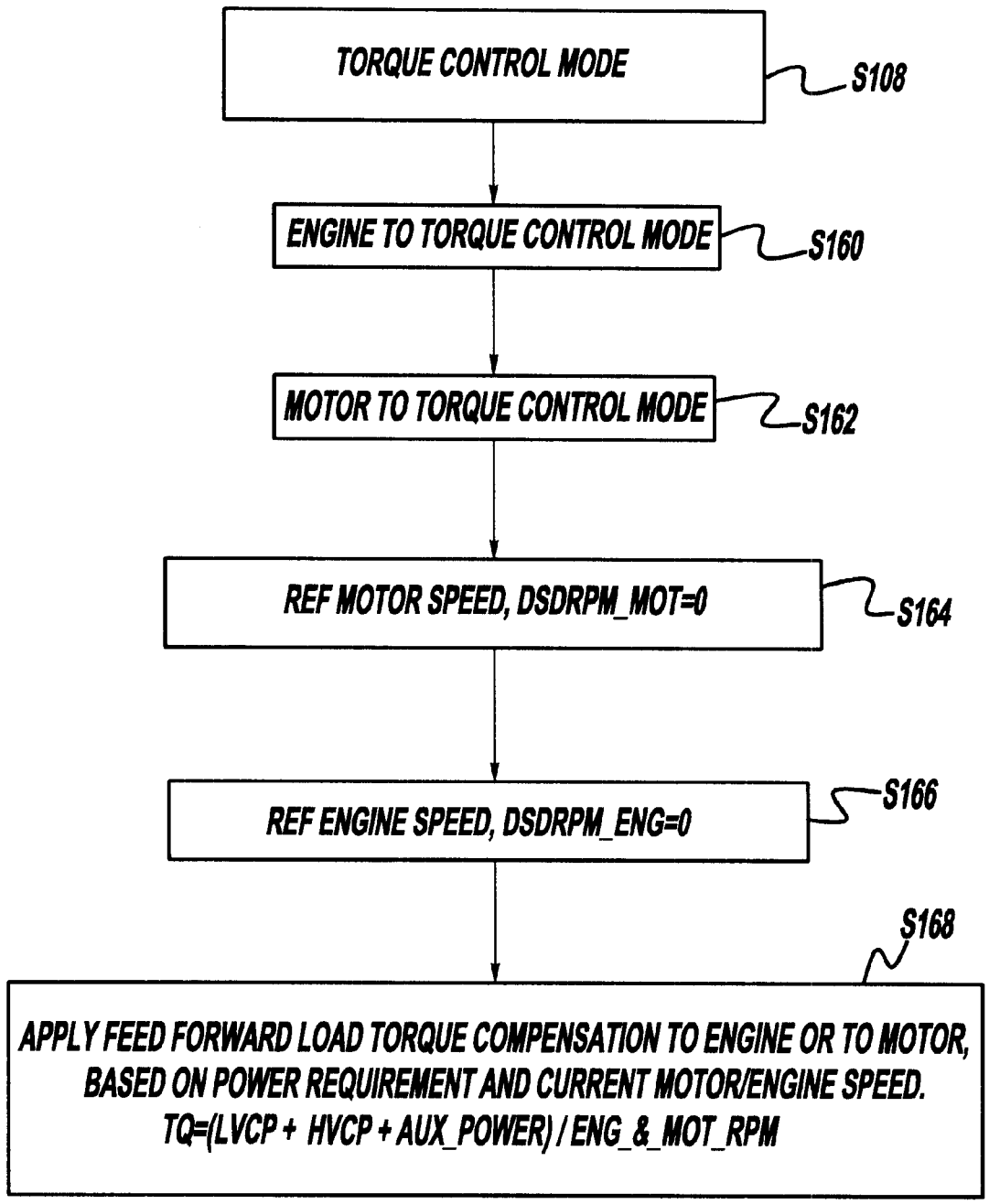
FIG. 5 is a flow chart depicting an alternative torque control mode of the system of the present invention.

Accordingly, in step S156, the PSC 12 determines a reference speed for the electric motor 18. The value of DSDRMP_MOT is calculated based upon the load requirements, DSDRPM_12 V, DSDRPM_300 V, and including DSDRPM_AC, as well as the minimum allowable motor speed, MIN_MOT_RPM. The ECU 16 thereby directed to control the motor, at a rotational speed as determined by the MCU 16. In step S158, the PSC 12 commands to the MCU the feedforward torque request based on the power requirements of the various powertrain loads and the required idle speed. In step S106, if the PSC;12 does not detect an idle mode, then the PSC 12 progresses to step S108, the torque control mode. The torque control mode is detailed in FIG. 5.

Returning to step S106, if the PSC 12 does not detect an idle mode, then the PSC 12 progresses to step S108, the torque control mode. The torque control mode is detailed in FIG. 5.

The PSC 12 executes the torque control mode by initializing the torque control mode in the MCU 16 and the ECU 14 shown in steps S160 and S162 respectively. In step S164, the reference motor speed, DSDRPM_MOT, is set to zero. In step S166, the reference engine speed, DSDRPM_ENG, is also set to zero.

In step S188, the PSCL 12 monitors the torque output of the electric motor 18 and the internal combustion engine 20 and requests an feedforward torque adjustment term based upon the power requirement and the final idle speed of the powertrain. The feedforward torque adjustment term, TQ, may be selectively applied to either the electric motor 18 or the internal combustion engine 20. The torque adjustment term is calculated as the sum of the power requirements of the powertrain divided by the actual rotational speed of the electric motor 18 and internal combustion engine when rotating as one. That is, $$TQ=\{LVBC+HVBC+AUXP\}/ENG\_\&\_MOT\_RPM.$$

The PSC 12 continually calculates the feedforward torque adjustment term and controls both the electric motor 18 and the internal combustion engine 20 to supply the additional torque needed.

It should be apparent to those skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

We claim:

1. An idle speed control system for a hybrid vehicle, the idle speed control system comprising:

an internal combustion engine selectively coupled to a transmission by a clutch;

a motor-generator selectively coupled to the transmission by said clutch;

an ancillary device that receives power from at least one of said internal combustion engine or said motor generator;

a controller to control an idle mode of said hybrid vehicle;

whereby said controller receives inputs indicative of a drive state of said hybrid vehicle, calculates a torque demand value in response to said drive state, and selects one of an engine control mode and a motor-generator control mode to regulate an idle speed of the transmission based in part upon said drive state of said hybrid vehicle;

wherein said motor-generator control mode of said controller includes utilizing said motor-generator to provide a transient torque value, and further includes utilizing said internal combustion engine to provide a steady state torque value such that said torque demand value is satisfied.

2. The control system of claim 1 wherein said controller includes a powertrain system controller, a motor generator controller, and an engine controller.

3. The control system of claim 2 wherein said powertrain system controller, said motor-generator controller, and said engine controller are integrated forming a drive control system.

4. The control system of claim 1 further comprising a battery coupled to said motor-generator, said battery having a storage capacity value.

5. The control system of claim 1 wherein said idle mode includes one of a parking state, a neutral state, and a stationary state.

6. The control system of claim 1 wherein said ancillary device includes an air conditioning unit.

7. The control system of claim 1 wherein said drive state of said hybrid vehicle includes a gear state indicative of a gear in which said hybrid vehicle is operable, a battery state indicative of said storage capacity value of said battery, an internal combustion engine speed state indicative of a speed of the internal combustion engine, a motor generator speed state indicative of a speed of the motor generator, and an ancillary load state indicative of a power requirement for operating said ancillary device.

8. The control system of claim 1 wherein said engine control mode of said controller includes utilizing said internal combustion engine to provide a torque output value equal to said torque demand value and selectively disabling said motor-generator.

9. A method for regulating the idle speed of a transmission of a hybrid vehicle including an internal combustion engine selectively coupled to the transmission, a motor generator selectively coupled to the transmission, and a controller, the method comprising:

determining an idle mode of the transmission;

supplying said controller with inputs indicative of a drive state of said hybrid vehicle;

evaluating the drive state of said hybrid vehicle and calculating a torque demand from said transmission in order to regulate an idle speed of the transmission;

selecting one of an engine control mode or a motor-generator control mode in order to deliver the torque demand to the transmission such that the idle speed of the transmission is regulated;

wherein the step of selecting a motor-generator control mode includes utilizing said motor-generator to provide a transient torque value, and further includes utilizing said internal combustion engine to provide a steady state torque value such that said torque demand value is satisfied.

10. The method of claim 9 further comprising the step of determining a storage capacity of a battery coupled to said motor-generator.

11. The method of claim 9 wherein the step of determining an idle mode of the transmission includes determining the presence of one of a parking state, a neutral state, and a stationary state.

12. The method of claim 10 wherein the step of determining an idle mode of the transmission includes determining the presence of one of a battery state indicative of said storage capacity value of said battery, an internal combustion engine speed state indicative of a speed of the internal combustion engine, a motor generator speed state indicative of a speed of the motor generator, or an ancillary load state indicative of a power requirement for operating said ancillary device.

13. The method of claim 9 wherein the step of selecting an engine control mode includes utilizing said internal combustion engine to provide a torque output value equal to said torque demand value and selectively disabling said motor-generator.

* * * * *